US012724661B2

(12) United States Patent
Song et al.

(10) Patent No.: US 12,724,661 B2
(45) Date of Patent: Sep. 1, 2026

(54) CIRCUIT FOR STATUS MONITORING, AND FAULT RECOVERY AND ISOLATION FOR INTER-INTEGRATED CIRCUIT ($I^2C$) BUS, AND METHOD IMPLEMENTED BY THE SAME

(71) Applicant: Alpha Networks Inc., Hsinchu (TW)

(72) Inventors: Peng-Fei Song, Hsinchu (TW); Xiao-Gang Luo, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 119 days.

(21) Appl. No.: 18/753,786

(22) Filed: Jun. 25, 2024

(65) Prior Publication Data

US 2025/0068503 A1 Feb. 27, 2025

(30) Foreign Application Priority Data

Aug. 21, 2023 (CN) ......................... 202311053105.9

(51) Int. Cl.
*G06F 11/00* (2006.01)
*G06F 11/07* (2006.01)

(52) U.S. Cl.
CPC ........ *G06F 11/079* (2013.01); *G06F 11/0772* (2013.01); *G06F 11/0793* (2013.01)

(58) Field of Classification Search
CPC . G06F 11/079; G06F 11/0772; G06F 11/0793
See application file for complete search history.

(56) References Cited

U.S. PATENT DOCUMENTS

2014/0244874 A1* 8/2014 Erickson ............. G06F 11/0793 710/110
2015/0058660 A1* 2/2015 Baker ................. G06F 11/1415 714/5.1

(Continued)

FOREIGN PATENT DOCUMENTS

CN 1704906 A 12/2005
CN 102521187 A 6/2012

(Continued)

OTHER PUBLICATIONS

Search Report appended to an Office Action, which was issued to Taiwanese counterpart application No. 112131923 by the TIPO on Dec. 7, 2023, with an English translation thereof.

*Primary Examiner* — Bryce P Bonzo
*Assistant Examiner* — Mathew Donald Gustafson
(74) *Attorney, Agent, or Firm* — Blank Rome LLP

(57) ABSTRACT

A circuit for status monitoring, and fault recovery and isolation for an $I^2C$ bus is provided. The $I^2C$ bus is electrically connected to a master device and a plurality of slave devices. Each of the slave devices has an address. The circuit includes a receiver unit, a decoder unit, and a troubleshooting unit. The receiver unit can receive a data signal and a clock signal that are transmitted from the master device to the $I^2C$ bus. The decoder unit is configured to obtain address information and a read/write bit based on the data signal and the clock signal. The troubleshooting unit is configured to, when the troubleshooting unit determines that a target slave device is malfunctioning based on the data signal, the clock signal, and the read/write bit, identify the target slave device based on the address information, and perform a troubleshooting operation on the target slave device.

17 Claims, 4 Drawing Sheets

(56) References Cited

U.S. PATENT DOCUMENTS

| | | | | |
|---|---|---|---|---|
| 2018/0203779 | A1* | 7/2018 | Huang ................ | G06F 11/3048 |
| 2024/0111619 | A1* | 4/2024 | Tao ..................... | G06F 11/0745 |

FOREIGN PATENT DOCUMENTS

| | | | |
|---|---|---|---|
| CN | 108073540 | A | 5/2018 |
| CN | 115982069 | A | 4/2023 |

* cited by examiner

CIRCUIT FOR STATUS MONITORING, AND FAULT RECOVERY AND ISOLATION FOR INTER-INTEGRATED CIRCUIT ($I^2C$) BUS, AND METHOD IMPLEMENTED BY THE SAME

CROSS-REFERENCE TO RELATED APPLICATION

This application claims priority to Chinese Invention Patent Application No. 202311053105.9, filed on Aug. 21, 2023, the entire disclosure of which is incorporated by reference herein.

FIELD

The disclosure relates to a circuit for monitoring a bus, and more particularly to a circuit and a method for status monitoring, and fault recovery and isolation for an inter-integrated circuit ($I^2C$) bus.

BACKGROUND

Referring to FIG. 1, an inter-integrated circuit ($I^2C$) bus 1 is often used in a circuit system to connect different devices (or components) to achieve various functions. The $I^2C$ bus 1 is a 2-wire multi-master/multi-slave communication bus. Specifically, the physical interface of the $I^2C$ bus 1 includes two signal lines only: the serial clock (SCL) line and the serial data (SDA) line. All devices connected to the $I^2C$ bus 1 may communicate with each other through only these two signal lines. The $I^2C$ bus 1 supports multiple master devices and multiple slave devices, as long as their addresses do not conflict with each other, and a total number of devices connected to the $I^2C$ bus 1 does not exceed an upper limit of the $I^2C$ bus 1.

In practice, the devices connected to the $I^2C$ bus 1 may vary in type, have different methods of use, and correspond to control programs with different levels of reliability. Furthermore, the response speeds of the slave devices may differ significantly. When any of the devices in the circuit system fails to respond or takes too long to respond, the $I^2C$ bus 1 may hang, thus affecting an operation of the circuit system. However, a conventional circuit system does not actively monitor the status of the $I^2C$ bus 1. Instead, the conventional circuit system determines that the $I^2C$ bus 1 is malfunctioning only when a read operation or a write operation is unable to be performed on the $I^2C$ bus 1 normally. In such a case, the master device of the conventional circuit system would attempt to restore the $I^2C$ bus 1 by outputting nine clocks to the SCL line. If the outputted nine clocks failed to restore the $I^2C$ bus 1 (e.g., none of the slave devices responded), the master device would determine that the $I^2C$ bus 1 has hung, and the circuit system would be in a fault state and may even collapse.

SUMMARY

Therefore, an object of the disclosure is to provide a circuit for status monitoring, and fault recovery and isolation for an inter-integrated circuit ($I^2C$) bus, and a method implemented by the circuit that can alleviate at least one of the drawbacks of the prior art.

According to the disclosure, a circuit for status monitoring, and fault recovery and isolation for an inter-integrated circuit ($I^2C$) bus of an electronic system is provided. The $I^2C$ bus is electrically connected to a master device and a plurality of slave devices so that the master device and the slave devices communicate with each other through the $I^2C$ bus. The master device includes a data (DA) line and a clock (CL) line that are respectively connected to a serial data (SDA) line and a serial clock (SCL) line of the $I^2C$ bus, and each of the slave devices has an address. The circuit includes a receiver unit, a decoder unit, and a troubleshooting unit. The receiver unit is to be electrically connected to the DA line and the CL line of the master device, and is configured to receive a data signal that is transmitted through the DA line and a clock signal that is transmitted through the CL line. The decoder unit is electrically connected to the receiver unit and is configured to obtain, based on the data signal and the clock signal received from the receiver unit, address information and a read/write bit. The address information indicates the address of a target slave device, which is one of the slave devices that the master device attempts to communicate with, and the read/write bit represents one of read operation and write operation the master device attempts to perform on the target slave device. The troubleshooting unit is electrically connected to the receiver unit, the decoder unit, and the slave devices. The troubleshooting unit is configured to, when the troubleshooting unit determines that one of a logic level of the data signal and a logic level of the clock signal received from the receiver unit does not conform with an $I^2C$ protocol and when the troubleshooting unit determines based on the read/write bit that the target slave device is malfunctioning, identify the target slave device based on the address information received from the decoder unit, and perform a troubleshooting operation on the target slave device. In some embodiments, the troubleshooting unit is further configured to, when the troubleshooting unit determines based on the read/write bit that the master device is malfunctioning, perform the troubleshooting operation on the master device.

According to another aspect of the disclosure, a method for status monitoring, and fault recovery and isolation for an $I^2C$ bus of an electronic system is provided. The $I^2C$ bus is electrically connected to a master device and a plurality of slave devices, so that the master device and the slave devices communicate with each other through the $I^2C$ bus. The master device includes a DA line and a CL line that are respectively connected to an SDA line and an SCL line of the $I^2C$ bus, and each of the slave devices has an address. The method includes providing a circuit including a receiver unit that is electrically connected to the DA line and the CL line of the master device, a decoder unit that is electrically connected to the receiver unit, and a troubleshooting unit that is electrically connected to the receiver unit, the decoder unit, and the slave devices. The receiver unit receives a data signal that is transmitted through the DA line and a clock signal that is transmitted through the CL line. The decoder unit obtains, based on the data signal and the clock signal received from the receiver unit, address information and a read/write bit, wherein the address information indicates the address of a target slave device, which is one of the slave devices that the master device attempts to communicate with, and the read/write bit represents one of read operation and write operation the master device attempts to perform on the target slave device. When the troubleshooting unit determines that one of a logic level of the data signal and a logic level of the clock signal received from the receiver unit does not conform with an $I^2C$ protocol and when the troubleshooting unit determines based on the read/write bit that the target slave device is malfunctioning, the troubleshooting unit identifies the target slave device based on the address information received from the decoder unit, and performs a troubleshooting operation on the target slave device. In some embodiments, when the troubleshooting unit determines based on the read/write bit that the master device is malfunctioning, the troubleshooting unit performs the troubleshooting operation on the master device.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
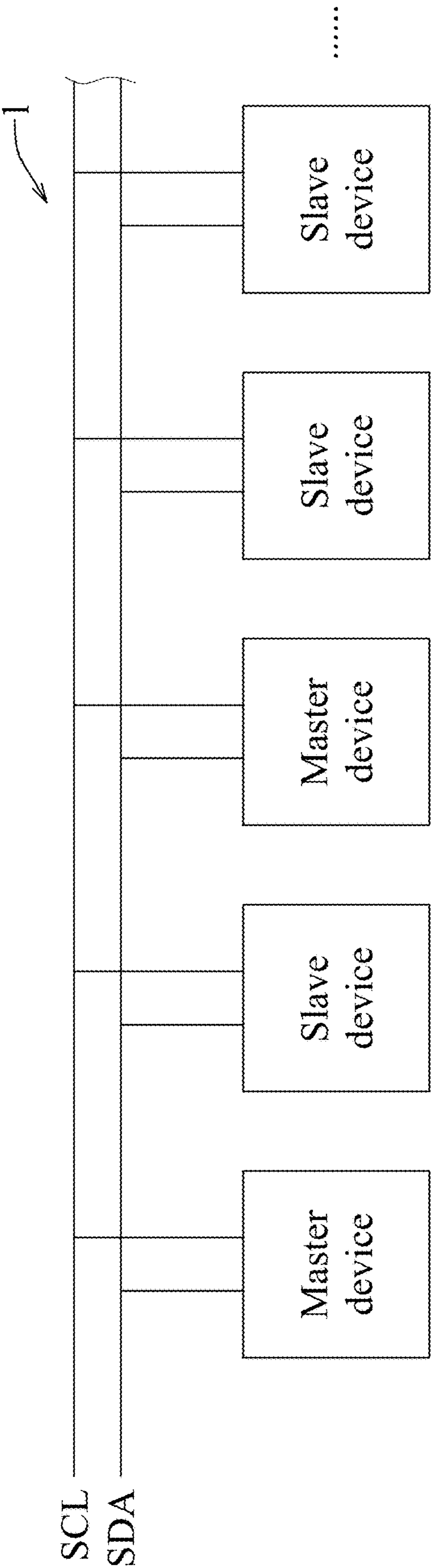
FIG. 1 is a schematic diagram illustrating a physical architecture of an $I^2C$ bus.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
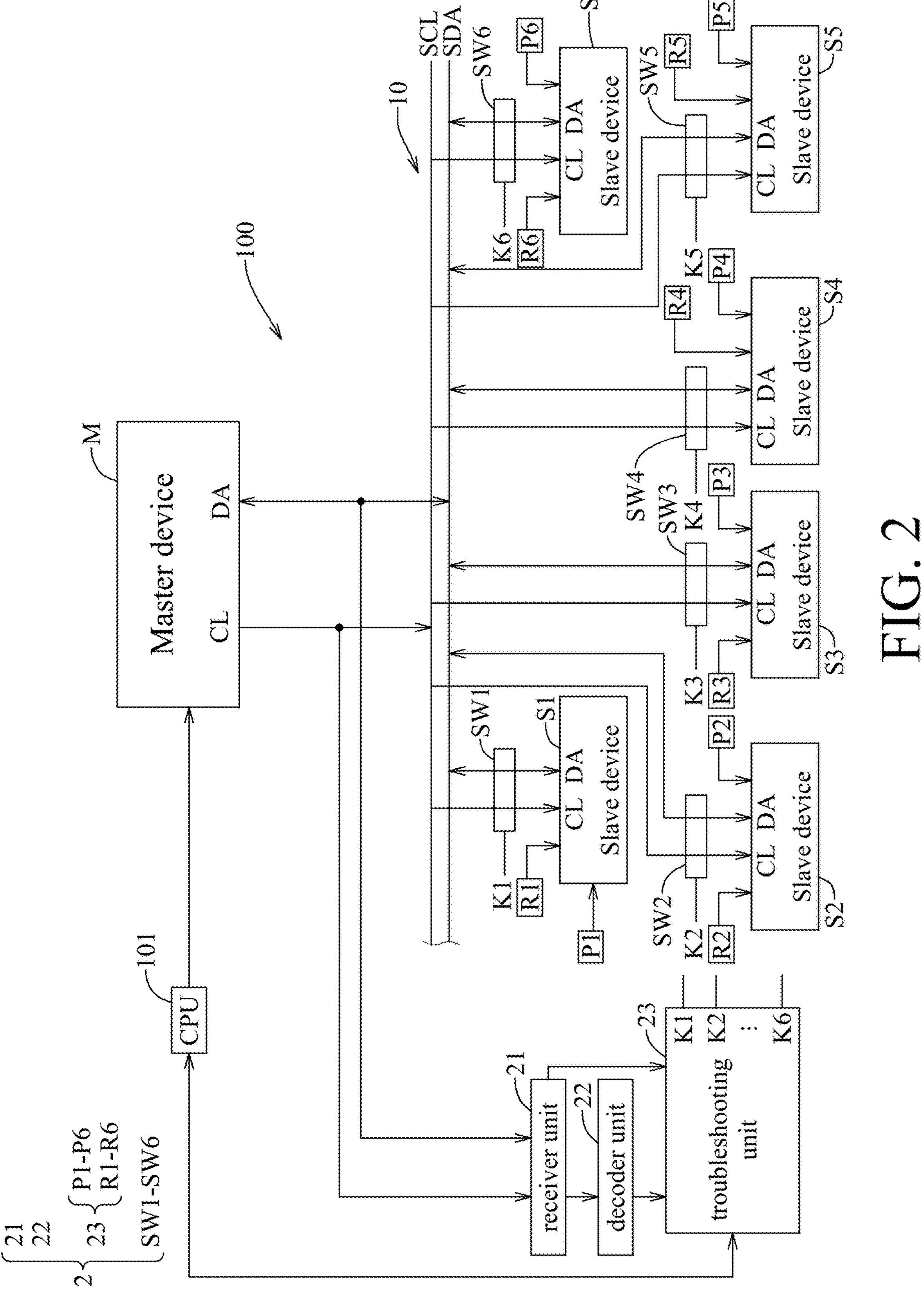
FIG. 2 is a block diagram illustrating a circuit for status monitoring, and fault recovery and isolation for an $I^2C$ bus according to an embodiment of the disclosure.

Referring to FIG. 2, a monitoring circuit 2 is provided for status monitoring, and fault recovery and isolation for an inter-integrated circuit ($I^2C$) bus 10 of an electronic system 100 according to an embodiment of the disclosure. The $I^2C$ bus 10 is electrically connected to a master device M and a plurality of slave devices (e.g., six slave devices S1-S6, but the disclosure is not limited to such), so that the master device M and the slave devices S1-S6 may communicate with each other through the $I^2C$ bus 10. The master device M and the slave devices S1-S6 each includes a data (DA) line and a clock (CL) line that are respectively connected to a serial data (SDA) line and a serial clock (SCL) line of the $I^2C$ bus 10. The slave devices S1-S6 have different addresses. It should be noted that one or more of the slave devices may be a bus switch that allows multiple additional slave devices to be connected thereto and thus be electrically connected to the $I^2C$ bus 10. As such, more slave devices may be electrically connected to the $I^2C$ bus 10.

In this embodiment, the monitoring circuit 2 includes a receiver unit 21, a decoder unit 22 that is electrically connected to the receiver unit 21, and a troubleshooting unit 23 that is electrically connected to the receiver unit 21, the decoder unit 22, and the slave devices S1-S6.

Figure 3:
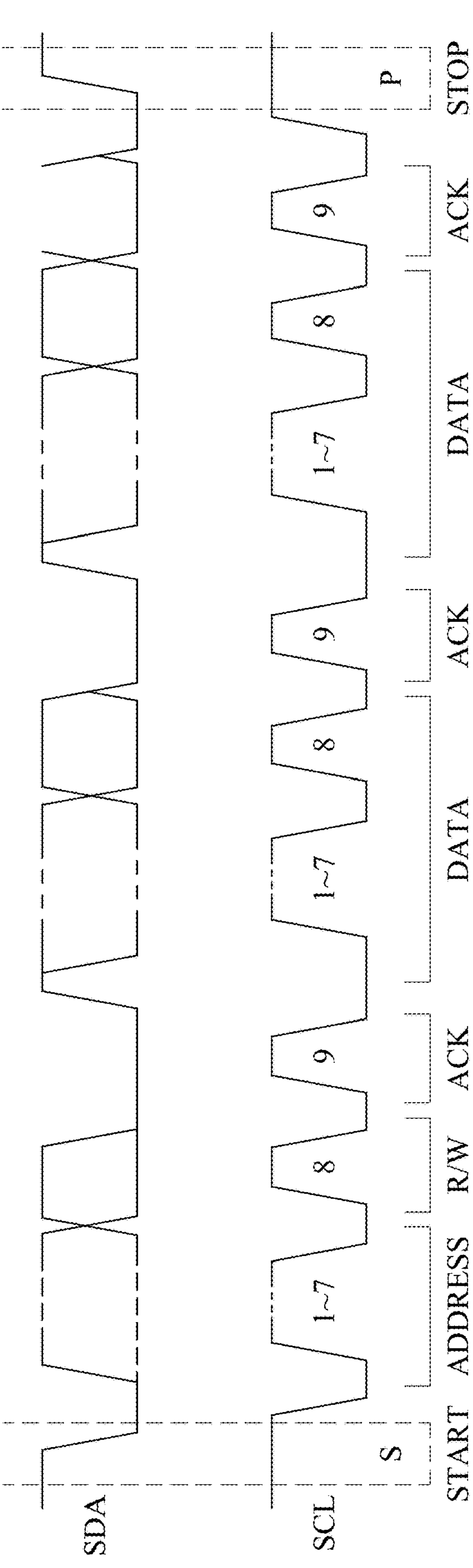
FIG. 3 is a timing diagram illustrating logic levels of a data signal and a clock signal transmitted by the $I^2C$ bus.

The receiver unit 21 is electrically connected to the DA line and the CL line of the master device M, and is configured to receive a data signal that is transmitted through the DA line (identical to a signal transmitted on the SDA line, as exemplified in FIG. 3) and a clock signal that is transmitted through the CL line (identical to a signal transmitted on the SCL line, as exemplified in FIG. 3).

Specifically, according to a transmission timing specified by an $I^2C$ bus transmission protocol (hereinafter referred to as "$I^2C$ protocol"), a communication in the $I^2C$ bus 10 always starts from the master device M, where the master device M outputs the clock signal to the SCL line of the $I^2C$ bus 10 through the CL line of the master device M, and the master device M may control any of the slave devices S1-S6 through serial communication based on its individual address.

The $I^2C$ protocol defines two basic operations of the $I^2C$ bus 10: read (R) and write (W) (both being a synchronous serial communication method with a master-slave structure). As shown in FIG. 3, the communication is initiated with a START condition, and ends with a STOP condition. An acknowledgement (ACK) bit is output by the master device M or any of the slave devices S1-S6 each time the communication has been received, so as to indicate that the communication is operating normally. That is to say, when the master device M is to write (W) data to one of the slave devices S1-S6, said one of the slave devices S1-S6 outputs the ACK bit upon receiving the data signal from the master device M; when the master device M is to read (R) data from one of the slave devices S1-S6, the master device M outputs the ACK bit upon receiving the data signal from said one of the slave devices S1-S6.

To describe in further detail, as exemplified in FIG. 3, a communication frame of the communication consists of the START condition, an address frame, at least one data frame, and the STOP condition in the given order. The address frame consists of a 7-bit ADDRESS, a read/write (R/W) bit, and the ACK bit. The data frame consists of a DATA byte (8 bits in size), and the ACK bit. The data signal that is transmitted through the SDA line of the $I^2C$ bus 10 is only allowed to be changed when the clock signal on the SCL line is equal to 0 (i.e., at logical low). That is to say, when the clock signal on the SCL line is equal to 1 (i.e., at logical high), the data signal that is transmitted through the SDA line must remain unchanged.

Figure 4:
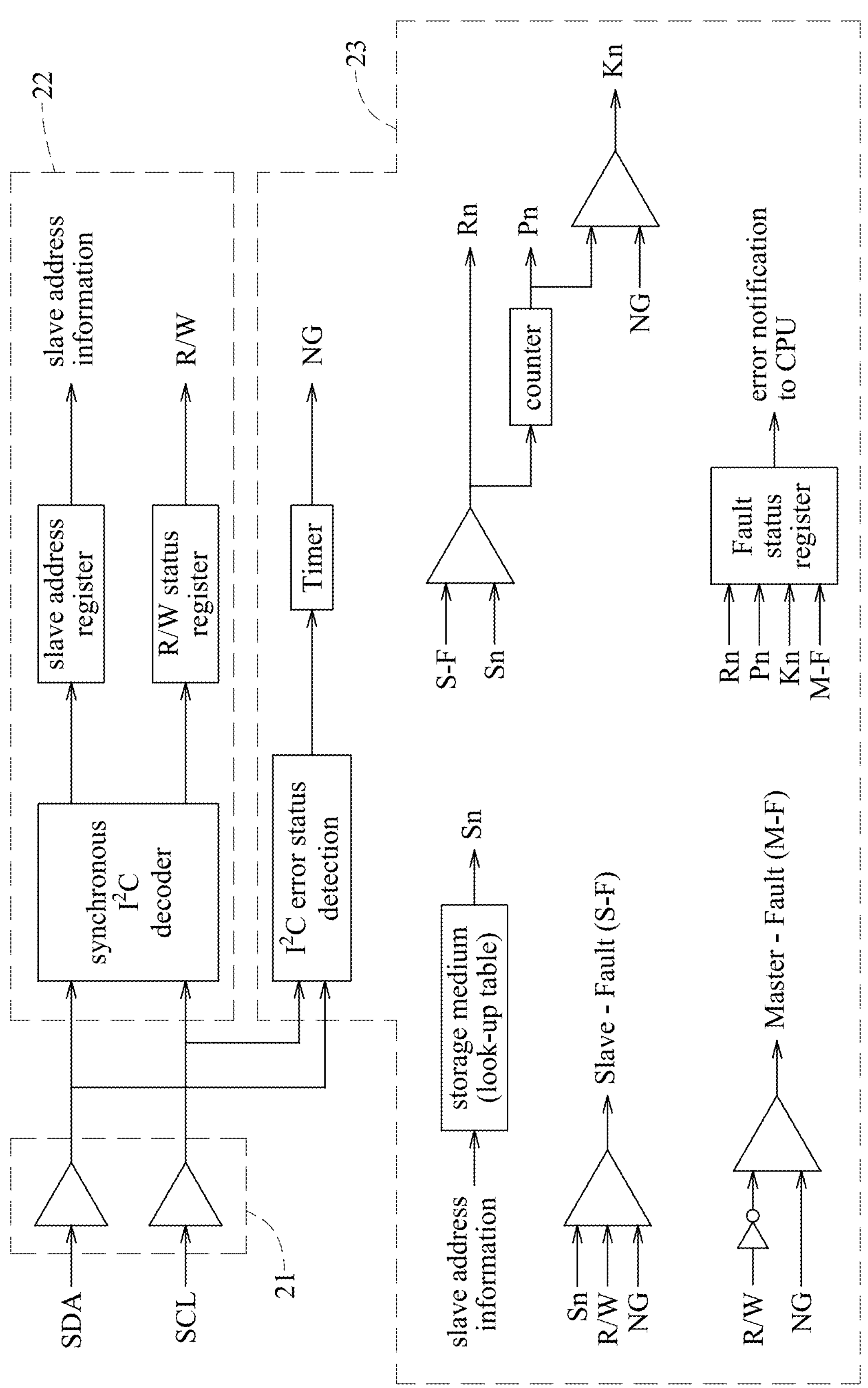
FIG. 4 is a block diagram illustrating structure and/or mechanism of a receiver unit, a decoder unit, and a troubleshooting unit of the circuit according to an embodiment.

Referring to FIGS. 2 and 4, the receiver unit 21 is configured to provide the data signal and the clock signal to the decoder unit 22 and the troubleshooting unit 23 so as to allow the monitoring circuit 2 to perform a method for status monitoring, and fault recovery and isolation for the $I^2C$ bus 10 (i.e., a monitoring procedure).

The decoder unit 22 is configured to, after receiving the data signal and the clock signal from the receiver unit 21, decode the data signal and the clock signal based on the transmission timing and the communication frame defined by the $I^2C$ protocol as mentioned above, so as to obtain address information and the read/write bit. In this embodiment, the decoder unit 22 may decode the data signal and the clock signal using a synchronous $I^2C$ decoder, and the address information and the read/write bit may each be stored in a register. The address information indicates the address of a target slave device, which is one of the slave devices S1-S6 that the master device M attempts to communicate with, and the read/write bit represents one of the read operation and the write operation the master device M attempts to perform on the target slave device. In the following description, the target slave device is exemplified to be the slave device S3. Specifically, when the read/write bit has a value of one, it indicates that the master device M is attempting to read data from the slave device S3, and when the read/write bit has a value of zero, it indicates that the master device M is attempting to write data to the slave device S3. The decoder unit 22 is further configured to send the address information (i.e., the address of the slave device S3 in the above example) and the read/write bit to the troubleshooting unit 23.

The troubleshooting unit 23 includes a timer that is configured to measure a duration of a logic level of the data signal maintained at logic one or logic zero, and/or a duration of a logic level of the clock signal maintained at logic one or logic zero. The troubleshooting unit 23 is configured to determine that the $I^2C$ bus 10 is malfunctioning when the logic level of the data signal and/or the logic level of the clock signal does not conform with the $I^2C$ protocol, which is when one of the following pre-stored conditions is met: 1) the logic level of the clock signal is continuously equal to one for more than one second, while the logic level of the data signal is continuously equal to zero for more than one second (namely, the clock signal remains at logic one and the data signal stays at logic zero simultaneously for a duration of more than one second); 2) the data signal does not include the ACK bit for more than one second; and 3) the logic level of the clock signal is continuously equal to zero for more than one second. The troubleshooting unit 23 is further configured to, when it is determined that the $I^2C$ bus 10 is malfunctioning, generate a no good (NG) signal to indicate that the $I^2C$ bus 10 is malfunctioning.

The troubleshooting unit 23 includes a plurality of power switch control circuits (e.g., six power switch control circuits P1-P6) that are electrically connected to the slave devices S1-S6 respectively, and that are configured to control electric supply to the slave devices S1-S6 respectively, and further includes a plurality of reset circuits (e.g., six reset circuits R1-R6) that are electrically connected to and configured to reset the slave devices S1-S6 respectively.

The monitoring circuit 2 further includes a plurality of switch circuits (e.g., six switch circuits SW1-SW6). Each of the switch circuits SW1-SW6 is electrically connected between the SDA line and the DA line of a respective one of the slave devices S1-S6, and between the SCL line and the CL line of the respective one of the slave devices S1-S6, and is configured to control connection (i.e., enabling or disabling connection) of the DA line and the CL line of the respective one of the slave devices S1-S6 to the $I^2C$ bus 10. The troubleshooting unit 23 further includes a plurality of switch control pins (e.g., six switch control pins K1-K6) that are electrically connected to and configured to control operation of the switch circuits SW1-SW6 respectively.

The troubleshooting unit 23 further includes a storage medium (e.g., flash memory) that stores a look-up table (as shown in Table 1). The look-up table records correspondence among the power switch control circuits P1-P6, the reset circuits R1-R6, the switch control pins K1-K6, and the addresses of the slave devices S1-S6.

TABLE 1

| Slave device address | Power switch control circuit | Reset circuit | Switch control pin |
|---|---|---|---|
| S1-address | P1 | R1 | K1 |
| S2-address | P2 | R2 | K2 |
| S3-address | P3 | R3 | K3 |
| S4-address | P4 | R4 | K4 |
| S5-address | P5 | R5 | K5 |
| S6-address | P6 | R6 | K6 |

As such, the troubleshooting unit 23 may identify the slave device S3 based on the address information received from the decoder unit 22 and the look-up table, and may determine, based on the clock signal that is transmitted through the CL line of the master device M and the data signal transmitted through the DA line of the master device M (which are the same as the signals that are transmitted on the $I^2C$ bus 10), that the $I^2C$ bus 10 is malfunctioning when the logic level of the data signal and/or the logic level of the clock signal do not or does not conform with the $I^2C$ protocol. The troubleshooting unit 23 may further determine, based on the read/write bit received from the decoder unit 22, which one of the master device M or the slave device S3 is malfunctioning.

In one example, according to the $I^2C$ protocol, when the read/write bit has a value of one, it means that the master device M is attempting to perform the read operation, and thus the data should be transmitted from the slave device S3 to the master device M. That is, based on the clock signal sent by the master device M through the CL line thereof, the slave device S3 should output the data signal through the DA line thereof to the SDA line of the $I^2C$ bus 10, so that the data signal may be transmitted to the master device M through the data line DA thereof, and the master device M outputs the ACK bit after receiving the data signal. In this case, the ACK bit is outputted by the master device M to indicate that the communication is operating normally (i.e., the data signal would not include the ACK bit when the communication was not operating normally). When the troubleshooting unit 23 determines that the logic level of the clock signal transmitted through the CL line of the master device M is continuously equal to one for more than one second, while the logic level of the data signal transmitted through the DA line of the master device M is continuously equal to zero for more than one second, the troubleshooting unit 23 would determine that the master device M is malfunctioning, since the clock signal was outputted by the master device M. When the troubleshooting unit 23 determines that the master device M should have, but did not output the ACK bit at the ninth bit of the data frame of the data signal (see FIG. 3) for more than one second, the troubleshooting unit 23 would determine that the master device M is malfunctioning. When the troubleshooting unit 23 determines that the logic level of the clock signal is continuously equal to zero for more than one second, the troubleshooting unit 23 would determine that the slave device S3 is malfunctioning.

In another example, according to the $I^2C$ protocol, when the read/write bit has a value of zero, it means that the master device M is attempting to perform the write operation, and thus the data should be transmitted from the master device M to the slave device S3. That is, based on the clock signal sent by the master device M through the CL line thereof, the master device M should output the data signal through the DA line thereof to the SDA line of the $I^2C$ bus 10, so that the data signal may be transmitted to the slave device S3 through the data line DA thereof, and the slave device S3 outputs the ACK bit after receiving the data signal. In this case, the ACK bit is outputted by the slave device S3 to indicate that the communication is operating normally. When the troubleshooting unit 23 determines that the logic level of the clock signal transmitted through the CL line of the master device M is continuously equal to one for more than one second, while the logic level of the data signal transmitted through the DA line of the master device M is continuously equal to zero for more than one second, the troubleshooting unit 23 would determine that the master device M is malfunctioning, since both the clock signal and the data signal were outputted by the master device M. When the troubleshooting unit 23 determines that the slave device S3 should have, but did not output the ACK bit at the ninth bit of the data frame of the data signal (see FIG. 3) for more than one second, the troubleshooting unit 23 would determine that the slave device S3 is malfunctioning. When the troubleshooting unit 23 determines that the logic level of the clock signal is continuously equal to zero for more than one second, the troubleshooting unit 23 would determine that the master device M is malfunctioning.

When the troubleshooting unit 23 determines that the slave device S3 is malfunctioning, the troubleshooting unit 23 performs a troubleshooting operation on the slave device S3.

To describe in further detail, during the troubleshooting operation, the troubleshooting unit 23 obtains the power switch control circuit P3, the reset circuit R3, and the switch control pin K3 each corresponding to (i.e., electrically connected to) the target slave device (i.e., the slave device S3) from the look-up table as shown in Table 1 based on the address information (i.e., S3-address). In one example, the troubleshooting operation further includes the troubleshooting unit 23 cutting off the electric supply to the slave device S3 through the power switch control circuit P3, so as to isolate the slave device S3 (i.e., the slave device that is malfunctioning) from the $I^2C$ bus 10 temporarily (e.g., for a few seconds), and resuming the electric supply to the slave device S3 so as to allow the slave device S3 to be reconnected to the $I^2C$ bus 10.

In another example, the troubleshooting operation further includes the troubleshooting unit 23 sending a reset signal to the slave device S3 through the reset circuit R3, so as to reset the slave device S3 and isolate the slave device S3 from the $I^2C$ bus 10 temporarily (e.g., for a few seconds), and allowing the slave device S3 to be reconnected to the $I^2C$ bus 10 after the slave device S3 has been reset.

After completing the troubleshooting operation, the troubleshooting unit 23 notifies the master device M, through a central processing unit (CPU) 101 of the electronic system 100, to make another attempt to communicate with the slave device S3, and the monitoring circuit 2 performs the monitoring procedure again so as to determine whether the communication is still not operating normally on the $I^2C$ bus 10. When it has been determined that the communication is still not operating normally, it means that the slave device S3 is still malfunctioning, and thus the troubleshooting unit 23 would perform the troubleshooting operation again on the slave device S3. In this embodiment, the troubleshooting unit 23 includes a counter that stores an attempt count which indicates how many times the troubleshooting operation (e.g., resetting the slave device S3) has been performed.

Furthermore, when the troubleshooting unit 23 determines that the slave device S3 is still malfunctioning after the troubleshooting operation has been performed for a predetermined number of times (e.g., 3 to 5 times) based on the attempt count stored in the counter, the troubleshooting unit 23 would disconnect the slave device S3 from the $I^2C$ bus 10. That is to say, the troubleshooting unit 23 cuts off the electric supply to the slave device S3 through the power switch control circuit P3, or controls the switch circuit SW3 through the switch control pin K3 to disconnect the CL line and the DA line of the slave device S3 from the $I^2C$ bus 10, so as to isolate the slave device S3 from the $I^2C$ bus 10. As such, the other slave devices S1, S2, S4-S6 on the $I^2C$ bus 10 may still be able to communicate normally with the master device M, thus ensuring that the $I^2C$ bus 10 maintains normal operation without being affected by the slave device that is malfunctioning (i.e., the slave device S3).

In yet another example, the troubleshooting operation further includes the troubleshooting unit 23 first sending the reset signal to the slave device S3 through the reset circuit R3. If the slave device S3 is still malfunctioning after the troubleshooting operation has been performed for the predetermined number of times, the troubleshooting unit 23 would cut off the electric supply to the slave device S3 through the power switch control circuit P3, and then resume the electric supply to the slave device S3. If the slave device S3 is still malfunctioning, the troubleshooting unit 23 would then control the switch circuit SW3 through the switch control pin K3 to isolate the slave device S3 from the $I^2C$ bus 10.

At the same time, the troubleshooting unit 23 records fault information that is related to the slave device S3, and sends an $I^2C$ bus error notification to the CPU 101, so that the CPU 101 reads the fault information stored in the monitoring circuit 2 (i.e., the troubleshooting unit 23) through a communication interface (such as but not limited to a serial peripheral interface (SPI) bus) based on the $I^2C$ bus error notification, and notifies a system administrator of the electronic system 100 regarding the fault in the $I^2C$ bus 10 based on the fault information. In this embodiment, the fault information is recorded in a fault status register included in the troubleshooting unit 23, and indicates which one of the reset circuit R3, the power switch control circuit P3, and the switch control pin K3 was operated on during the troubleshooting operation.

On the other hand, when the troubleshooting unit 23 determines that the master device M is malfunctioning, the troubleshooting unit 23 sends a master device error notification to the CPU 101, so that the CPU 101 performs troubleshooting on the master device M based on the master device error notification, such as resetting the master device M. In this embodiment, the troubleshooting unit 23 records fault information that is related to the master device M in the fault status register.

It should be noted that the power switch control circuits P1-P6, the reset circuits R1-R6, and the switch circuits SW1-SW6 may be selectively used in the monitoring circuit 2 (i.e., using at least one type of these circuits) according to the design requirements of the monitoring circuit 2. In this embodiment, the monitoring circuit 2 may be implemented as, but is not limited to, a microcontroller unit (MCU), the CPU 101, or a field programmable gate array (FPGA), etc. The receiver unit 21, the decoder unit 22, and the troubleshooting unit 23 may each include a plurality of logic gates and/or registers to achieve their respective functions.

In summary, the monitoring circuit 2 determines, based on the logic level of the data signal, the logic level of the clock signal and the logical relationships between the data signal and the clock signal, whether an error has occurred in the $I^2C$ bus 10 and whether the master device M or one of the slave devices S1-S6 is malfunctioning, and immediately performs troubleshooting or isolates the device that is malfunctioning, so as to ensure that the $I^2C$ bus 10 may still operate normally without being affected by the device that is malfunctioning, which greatly improves the stability of operation of the $I^2C$ bus 10.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A circuit for status monitoring, and fault recovery and isolation for an inter-integrated circuit ($I^2C$) bus of an electronic system, the $I^2C$ bus being electrically connected to a master device and a plurality of slave devices so that the master device and the slave devices communicate with each other through the $I^2C$ bus, the master device including a data (DA) line and a clock (CL) line that are respectively connected to a serial data (SDA) line and a serial clock (SCL) line of the $I^2C$ bus, each of the slave devices having an address, said circuit comprising:

a receiver unit to be electrically connected to the DA line and the CL line of the master device, and configured to receive a data signal that is transmitted through the DA line and a clock signal that is transmitted through the CL line;

a decoder unit electrically connected to said receiver unit and configured to obtain, based on the data signal and the clock signal received from said receiver unit, address information and a read/write bit, wherein the address information indicates the address of a target slave device, which is one of the slave devices that the master device attempts to communicate with, and the read/write bit represents one of a read operation and a write operation the master device attempts to perform on the target slave device; and a troubleshooting unit electrically connected to said receiver unit, said decoder unit, and the slave devices, said troubleshooting unit being configured to, when said troubleshooting unit determines that one of a logic level of the data signal and a logic level of the clock signal received from said receiver unit does not conform with an $I^2C$ protocol and when said troubleshooting unit determines based on the read/write bit that the target slave device is malfunctioning, identify the target slave device based on the address information received from said decoder unit, and perform a troubleshooting operation on the target slave device, and when said troubleshooting unit determines that one of the logic level of the data signal and the logic level of the clock signal does not conform with the $I^2C$ protocol and when said troubleshooting unit determines based on the read/write bit that the master device is malfunctioning, send a master device error notification to a central processing unit (CPU) of the electronic system, so that the CPU performs troubleshooting on the master device based on the master device error notification.

2. The circuit as claimed in claim 1, wherein said troubleshooting unit is configured to determine that one of the logic level of the data signal and the logic level of the clock signal does not conform with the $I^2C$ protocol when one of the following conditions is met:

the logic level of the clock signal is continuously equal to one for more than one second, while the logic level of the data signal is continuously equal to zero for more than one second;

the data signal does not include an acknowledgement bit for more than one second; and the logic level of the clock signal is continuously equal to zero for more than one second.

3. The circuit as claimed in claim 1, wherein said troubleshooting unit includes a plurality of power switch control circuits that are adapted to be electrically connected to and configured to control electric supply to the slave devices respectively, and said troubleshooting unit stores a look-up table that records correspondence between the power switch control circuits and the addresses of the slave devices; and wherein said troubleshooting unit is further configured to, during the troubleshooting operation:

obtain a target power switch control circuit, which is one of said power switch control circuits that is electrically connected to the target slave device, from the look-up table based on the address of the target slave device, cut off the electric supply to the target slave device through said target power switch control circuit, so as to isolate the target slave device from the $I^2C$ bus temporarily, and resume the electric supply to the target slave device so as to allow the target slave device to be reconnected to the $I^2C$ bus.

4. The circuit as claimed in claim 3, wherein said troubleshooting unit is further configured to, when said troubleshooting unit determines that the target slave device is still malfunctioning after the troubleshooting operation has been performed for a predetermined number of times, cut off the electric supply to the target slave device, record fault information that is related to the target slave device, and send an $I^2C$ bus error notification to the CPU of the electronic system, so that the CPU reads the fault information stored in said troubleshooting unit based on the $I^2C$ bus error notification, where the predetermined number is greater than or equal to two.

5. The circuit as claimed in claim 3, each of the slave devices including a DA line and a CL line that are respectively connected to the SDA line and the SCL line of the $I^2C$ bus, said circuit further comprising a plurality of switch circuits, each of said switch circuits being adapted to be electrically connected between the SDA line and the DA line of a respective one of the slave devices and between the SCL line and the CL line of the respective one of the slave devices, and being configured to control connection of the DA line and the CL line of the respective one of the slave devices to the $I^2C$ bus, wherein:

said troubleshooting unit further includes a plurality of switch control pins that are electrically connected to and configured to control operation of said switch circuits respectively, and the look-up table further records correspondence between the switch control pins and the addresses of the slave devices; and said troubleshooting unit is further configured to, when said troubleshooting unit determines that the target slave device is still malfunctioning after the troubleshooting operation has been performed for a predetermined number of times, obtain a target switch control pin, which is one of the switch control pins that is electrically connected to the target slave device, from the look-up table based on the address of the target slave device, and control, through said target switch control pin, a target switch circuit, which is one of the switch circuits that corresponds to said target switch control pin, to disconnect the CL line and the DA line of the target slave device from the $I^2C$ bus, so as to isolate the target slave device from the $I^2C$ bus, where the predetermined number is greater than or equal to two.

6. The circuit as claimed in claim 1, wherein said troubleshooting unit includes a plurality of reset circuits that are adapted to be electrically connected to and configured to reset the slave devices respectively, and said troubleshooting unit stores a look-up table that records correspondence between the reset circuits and the addresses of the slave devices; and wherein said troubleshooting unit is further configured to, during the troubleshooting operation:

obtain a target reset circuit, which is one of said reset circuits that is electrically connected to the target slave device, from the look-up table based on the address of the target slave device, and send a reset signal to the target slave device through said target reset circuit, so as to reset the target slave device and isolate the target slave device from the $I^2C$ bus temporarily, and to allow the target slave device to be reconnected to the $I^2C$ bus after the target slave device has been reset.

7. A method for status monitoring, and fault recovery and isolation for an inter-integrated circuit ($I^2C$) bus of an electronic system, the $I^2C$ bus being electrically connected to a master device and a plurality of slave devices, so that the master device and the slave devices communicate with each other through the $I^2C$ bus, the master device including a data (DA) line and a clock (CL) line that are respectively connected to a serial data (SDA) line and a serial clock (SCL) line of the $I^2C$ bus, each of the slave devices having an address, said method comprising:

providing a circuit including a receiver unit that is electrically connected to the DA line and the CL line of the master device, a decoder unit that is electrically connected to the receiver unit, and a troubleshooting unit that is electrically connected to the receiver unit, the decoder unit, and the slave devices;

the receiver unit receiving a data signal that is transmitted through the DA line and a clock signal that is transmitted through the CL line;

the decoder unit obtaining, based on the data signal and the clock signal received from the receiver unit, address information and a read/write bit, wherein the address information indicates the address of a target slave device, which is one of the slave devices that the master device attempts to communicate with, and the read/write bit represents one of read operation and write operation the master device attempts to perform on the target slave device;

when said troubleshooting unit determines that one of a logic level of the data signal and a logic level of the clock signal received from the receiver unit does not conform with an $I^2C$ protocol and when said troubleshooting unit determines based on the read/write bit that the target slave device is malfunctioning, identifying the target slave device based on the address information received from the decoder unit, and performing a troubleshooting operation on the target slave device; and when said troubleshooting unit determines that one of the logic level of the data signal and the logic level of the clock signal does not conform with the $I^2C$ protocol and when said troubleshooting unit determines based on the read/write bit that the master device is malfunctioning, the troubleshooting unit sending a master device error notification to a central processing unit (CPU) of the electronic system, so that the CPU performs troubleshooting on the master device based on the master device error notification.

8. The method as claimed in claim 7, wherein the troubleshooting unit determines that one of the logic level of the data signal and the logic level of the clock signal does not conform with the $I^2C$ protocol when one of the following conditions is met:

the logic level of the clock signal is continuously equal to one for more than one second, while the logic level of the data signal is continuously equal to zero for more than one second;

the data signal does not include an acknowledgement bit for more than one second; and the logic level of the clock signal is continuously equal to zero for more than one second.

9. The method as claimed in claim 7, the troubleshooting unit including a plurality of power switch control circuits that are electrically connected to and configured to control electric supply to the slave devices respectively, and the troubleshooting unit storing a look-up table that records correspondence between the power switch control circuits and the addresses of the slave devices, the method further comprising, during the troubleshooting operation:

the troubleshooting unit obtaining a target power switch control circuit, which is one of the power switch control circuits that is electrically connected to the target slave device, from the look-up table based on the address of the target slave device, the troubleshooting unit cutting off the electric supply to the target slave device through the target power switch control circuit, so as to isolate the target slave device from the $I^2C$ bus temporarily, and the troubleshooting unit resuming the electric supply to the target slave device so as to allow the target slave device to be reconnected to the $I^2C$ bus.

10. The method as claimed in claim 9, further comprising:

when said troubleshooting unit determines that the target slave device is still malfunctioning after the troubleshooting operation has been performed for a predetermined number of times, the troubleshooting unit cutting off the electric supply to the target slave device, recording fault information that is related to the target slave device, and sending an $I^2C$ bus error notification to the CPU of the electronic system, so that the CPU reads the fault information stored in the troubleshooting unit based on the $I^2C$ bus error notification, where the predetermined number is greater than or equal to two.

11. The method as claimed in claim 9, each of the slave devices including a DA line and a CL line that are respectively connected to the SDA line and the SCL line of the $I^2C$ bus, the circuit further including a plurality of switch circuits, each of the switch circuits being electrically connected between the SDA line and the DA line of a respective one of the slave devices and between the SCL line and the CL line of the respective one of the slave devices, and configured to control connection of the DA line and the CL line of the respective one of the slave devices to the $I^2C$ bus, the troubleshooting unit further including a plurality of switch control pins that are electrically connected to and configured to control operation of the switch circuits respectively, and the look-up table further recording correspondence between the switch control pins and the addresses of the slave devices, the method further comprising:

when said troubleshooting unit determines that the target slave device is still malfunctioning after the troubleshooting operation has been performed for a predetermined number of times, the troubleshooting unit obtaining a target switch control pin, which is one of the switch control pins that is electrically connected to the target slave device, from the look-up table based on the address of the target slave device, and controlling, through the target switch control pin, a target switch circuit, which is one of the switch circuits that corresponds to the target switch control pin, to disconnect the CL line and the DA line of the target slave device from the $I^2C$ bus, so as to isolate the target slave device from the $I^2C$ bus, where the predetermined number is greater than or equal to two.

12. The method as claimed in claim 7, the troubleshooting unit including a plurality of reset circuits that are electrically connected to and configured to reset the slave devices respectively, and the troubleshooting unit storing a look-up table that records correspondence between the reset circuits and the addresses of the slave devices, the method further comprising, during the troubleshooting operation:

the troubleshooting unit obtaining a target reset circuit, which is one of the reset circuits that is electrically connected to the target slave device, from the look-up table based on the address of the target slave device, and the troubleshooting unit sending a reset signal to the target slave device through the target reset circuit, so as to reset the target slave device and isolate the target slave device from the $I^2C$ bus temporarily, and to allow the target slave device to be reconnected to the $I^2C$ bus after the target slave device has been reset.

13. A circuit for status monitoring, and fault recovery and isolation for an inter-integrated circuit ($I^2C$) bus of an electronic system, the $I^2C$ bus being electrically connected to a master device and a plurality of slave devices so that the master device and the slave devices communicate with each other through the $I^2C$ bus, the master device including a data (DA) line and a clock (CL) line that are respectively connected to a serial data (SDA) line and a serial clock (SCL) line of the $I^2C$ bus, each of the slave devices having an address, said circuit comprising:

a receiver unit to be electrically connected to the DA line and the CL line of the master device, and configured to receive a data signal that is transmitted through the DA line and a clock signal that is transmitted through the CL line;

a decoder unit electrically connected to said receiver unit and configured to obtain, based on the data signal and the clock signal received from said receiver unit, address information and a read/write bit, wherein the address information indicates the address of a target slave device, which is one of the slave devices that the master device attempts to communicate with, and the read/write bit represents one of a read operation and a write operation the master device attempts to perform on the target slave device; and a troubleshooting unit electrically connected to said receiver unit, said decoder unit, and the slave devices, said troubleshooting unit including a plurality of reset circuits that are adapted to be electrically connected to and configured to reset the slave devices respectively, and said troubleshooting unit storing a look-up table that records correspondence between the reset circuits and the addresses of the slave devices, said troubleshooting unit being configured to, when said troubleshooting unit determines that one of a logic level of the data signal and a logic level of the clock signal received from said receiver unit does not conform with an $I^2C$ protocol and when said troubleshooting unit determines based on the read/write bit that the target slave device is malfunctioning, identify the target slave device based on the address information received from said decoder unit, and perform a troubleshooting operation on the target slave device, wherein said troubleshooting unit is further configured to, during the troubleshooting operation, obtain a target reset circuit, which is one of said reset circuits that is electrically connected to the target slave device, from the look-up table based on the address of the target slave device, and send a reset signal to the target slave device through said target reset circuit, so as to reset the target slave device and isolate the target slave device from the $I^2C$ bus temporarily, and to allow the target slave device to be reconnected to the $I^2C$ bus after the target slave device has been reset.

14. The circuit as claimed in claim 13, wherein said troubleshooting unit is configured to determine that one of the logic level of the data signal and the logic level of the clock signal does not conform with the $I^2C$ protocol when one of the following conditions is met:

the logic level of the clock signal is continuously equal to one for more than one second, while the logic level of the data signal is continuously equal to zero for more than one second;

the data signal does not include an acknowledgement bit for more than one second; and the logic level of the clock signal is continuously equal to zero for more than one second.

15. The circuit as claimed in claim 13, wherein said troubleshooting unit includes a plurality of power switch control circuits that are adapted to be electrically connected to and configured to control electric supply to the slave devices respectively, and said troubleshooting unit stores a look-up table that records correspondence between the power switch control circuits and the addresses of the slave devices; and wherein said troubleshooting unit is further configured to, during the troubleshooting operation:

obtain a target power switch control circuit, which is one of said power switch control circuits that is electrically connected to the target slave device, from the look-up table based on the address of the target slave device, cut off the electric supply to the target slave device through said target power switch control circuit, so as to isolate the target slave device from the $I^2C$ bus temporarily, and resume the electric supply to the target slave device so as to allow the target slave device to be reconnected to the $I^2C$ bus.

16. The circuit as claimed in claim 15, wherein said troubleshooting unit is further configured to, when said troubleshooting unit determines that the target slave device is still malfunctioning after the troubleshooting operation has been performed for a predetermined number of times, cut off the electric supply to the target slave device, record fault information that is related to the target slave device, and send an $I^2C$ bus error notification to a central processing unit (CPU) of the electronic system, so that the CPU reads the fault information stored in said troubleshooting unit based on the $I^2C$ bus error notification, where the predetermined number is greater than or equal to two.

17. The circuit as claimed in claim 15, each of the slave devices including a DA line and a CL line that are respectively connected to the SDA line and the SCL line of the $I^2C$ bus, said circuit further comprising a plurality of switch circuits, each of said switch circuits being adapted to be electrically connected between the SDA line and the DA line of a respective one of the slave devices and between the SCL line and the CL line of the respective one of the slave devices, and being configured to control connection of the DA line and the CL line of the respective one of the slave devices to the $I^2C$ bus, wherein:

said troubleshooting unit further includes a plurality of switch control pins that are electrically connected to and configured to control operation of said switch circuits respectively, and the look-up table further records correspondence between the switch control pins and the addresses of the slave devices; and said troubleshooting unit is further configured to, when said troubleshooting unit determines that the target slave device is still malfunctioning after the troubleshooting operation has been performed for a predetermined number of times, obtain a target switch control pin, which is one of the switch control pins that is electrically connected to the target slave device, from the look-up table based on the address of the target slave device, and control, through said target switch control pin, a target switch circuit, which is one of the switch circuits that corresponds to said target switch control pin, to disconnect the CL line and the DA line of the target slave device from the $I^2C$ bus, so as to isolate the target slave device from the $I^2C$ bus, where the predetermined number is greater than or equal to two.

* * * * *